(No Model.)
T. DILL.
STEAM CLUTCH.
No. 244,717. Patented July 19, 1881.
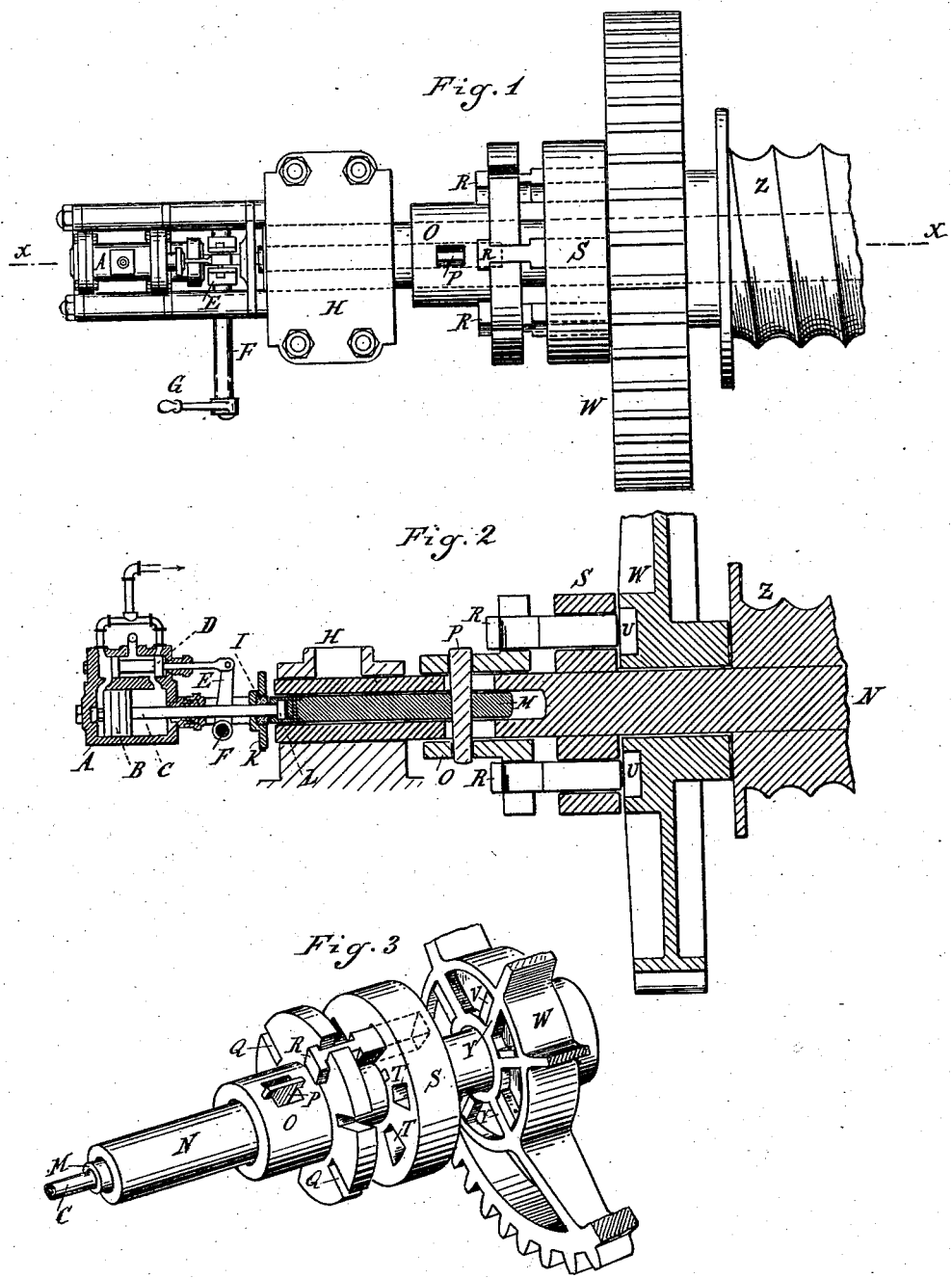
Witnesses:
George H. Carlisle
J. D. Keena
Inventor:
Thomas Dill
by Geo. H. Lothrop
his Atty.
N. PETERS, Photo-Lithographer, Washington, D. C.

UNITED STATES PATENT OFFICE.

THOMAS DILL, OF BAY CITY, ASSIGNOR TO JAMES CLEMENTS, OF ANN ARBOR, MICHIGAN.

STEAM-CLUTCH.

SPECIFICATION forming part of Letters Patent No. 244,717, dated July 19, 1881.

Application filed January 13, 1881. (No model.)

*To all whom it may concern:*

Be it known that I, THOMAS DILL, of Bay City, in the county of Bay and State of Michigan, have invented a new and useful Improvement in Steam-Clutches, of which the following is a specification.

In the drawings, Figure 1 is a plan view of my improved steam-clutch. Fig. 2 is a vertical section on line $x\ x$ in Fig. 1. Fig. 3 is an enlarged view of the clutch.

This invention relates to that class of clutches which are connected with one end of the piston-rod of a steam-cylinder, whereby the clutch is operated by the movements of the piston.

My invention consists in a certain construction and combination of parts, which will be fully hereinafter described in detail, and specifically pointed out in the claim.

N is a shaft, and Z is a winding-drum secured thereto.

W is a wheel or pulley, turned by power from any suitable source, and revolves freely on shaft N. In the side of wheel W are slots $v$ to receive the teeth R of a clutch.

S is a fast collar on shaft N, having slots cut through it parallel with shaft N, through which slots slide the teeth R of a clutch.

R are the teeth of a clutch.

O is a flanged collar sliding and turning freely on shaft N, and having slots Q in its flange.

Teeth R have narrow necks, which pass through slots Q, and at each end of the neck is a shoulder wider than slot Q, so that collar O, when moved, will also move teeth R; but there will be some lost motion between the collar O and the teeth R.

H is a bearing in which shaft N runs.

Shaft N is hollow a portion of its length, and in it is a metal rod, M, turning freely in and concentric with shaft N. Collar O has a slot cut in it, and in shaft N is cut a slot longer than the slot in collar O. Through these slots and through rod M passes a key, P, which locks collar O and rod M together, so that when rod M is reciprocated it will reciprocate collar O. It is better to make the slot in collar O wider than the thickness of key P, to avoid bending key P.

A is a steam-cylinder, having piston B and piston-rod C, the latter being in line with rod M, and connected therewith by a swivel-joint, L.

K is a stop packed with a piece of rubber or other elastic material, to cushion the end of rod M when the clutch is thrown out of gear and prevent piston B from striking the head of cylinder A.

F is a rock-shaft, having a handle, G, and arm E, connected to valve D, by means of which valve D, which is an ordinary slide-valve, can be set in any desired position.

When it is desired to throw the clutch into gear, valve D is thrown by the engineer into the position shown in Fig. 2, thereby admitting steam into the cylinder A at the left of piston B and forcing the piston toward the right of the drawings. Piston-rod C forces rod M to the right, which, by means of key P and sliding flanged collar O, forces teeth R through the slots in collar S and into slots or recesses $v$ in wheel W, thus locking collar S and wheel W firmly together. Swivel-joint L allows rod M and collar O to turn freely with shaft N without bringing any torsional strain on piston-rod C, while the steam-pressure, acting as above described, holds teeth R firmly in slots or recesses $v$.

By reversing valve D the piston is forced to the left, withdrawing teeth R from slots or recesses $v$ in wheel W, and the movement of the piston is checked by rod M coming in contact with rubber cushion I.

The lost motion between flanged sliding collar O and teeth R allows piston B to get under motion before being called upon to operate the clutch.

What I claim as my invention, and desire to secure by Letters Patent, is—

The combination of the steam-cylinder A, piston B, piston-rod C, rod M, key P, sliding flanged collar O, teeth R, fast collar S, shaft N, and wheel W, having slots or recesses $v$, all constructed, arranged, and operating substantially as herein described and shown.

THOMAS DILL.

Witnesses:
H. M. GILLETT,
E. A. COOLEY.